United States Patent
Fronk

(10) Patent No.: US 7,054,168 B1
(45) Date of Patent: May 30, 2006

(54) UNDERSHOOT ELIMINATOR CIRCUIT AND METHOD FOR SYNCHRONOUS RECTIFIED DC-DC CONVERTERS

(75) Inventor: Karl T. Fronk, Derry, NH (US)

(73) Assignee: Astec International Limited, Hong Kong (*) Notice: Subject to any disclaimer, the term of this patent is extended or adjusted under 35 U.S.C. 154(b) by 0 days.

(21) Appl. No.: 10/985,284

(22) Filed: Nov. 10, 2004

(51) Int. Cl.
*H02M 3/335* (2006.01)

(52) U.S. Cl. .............................. 363/21.06; 363/21.14; 363/127

(58) Field of Classification Search ............. 363/21.06, 363/21.14, 53, 56.11, 127
See application file for complete search history.

(56) References Cited

U.S. PATENT DOCUMENTS

| | | | | |
|---|---|---|---|---|
| 5,343,383 A | * | 8/1994 | Shinada et al. ............. | 363/127 |
| 5,724,235 A | * | 3/1998 | Shimamori et al. ...... | 363/21.06 |
| 6,813,166 B1 | * | 11/2004 | Chang et al. ............ | 363/21.14 |
| 6,882,548 B1 | * | 4/2005 | Jacobs et al. ............ | 363/21.06 |

* cited by examiner

Primary Examiner—Gary L Laxton
(74) Attorney, Agent, or Firm—Nixon Peabody LLP

(57) ABSTRACT

An undershoot eliminator circuit is disclosed that avoids the occurrence of a negative undershoot that typically happens when an isolated DC-DC converter with a secondary side synchronous driver that is turned off. The undershoot eliminator circuit functions to discharge an energy storage element in an auxiliary supply on said secondary side of said converter. The circuit includes a clamp transistor having a gate terminal, a source terminal, and a drain terminal, the drain terminal of the transistor connected to said storage element, the source terminal of the transistor connecting to the output of the converter; means for trapping charge on the gate terminal of the clamp transistor while said converter is on; and means for coupling the voltage on the output of the converter to the gate terminal, such that, when said converter goes off and its output voltage begins to drop, the trapped charge causes the gate-to-source voltage of the clamp transistor to increase until the gate of the transistor is sufficiently saturated to cause it to turn on for a sufficient time to discharge the storage element. The undershoot eliminator circuit preferably employs a capacitor for trapping a charge on the gate terminal of the clamp transistor. The storage capacitor is quickly discharged to avoid a negative undershoot from occurring when the DC/DC power converter is turned off.

11 Claims, 3 Drawing Sheets

UNDERSHOOT ELIMINATOR CIRCUIT AND METHOD FOR SYNCHRONOUS RECTIFIED DC-DC CONVERTERS

FIELD OF INVENTION

The present invention relates generally to power converters, and more particularly to a circuit for eliminating negative undershoot during the turn off of an isolated synchronous rectified DC-DC buck converter.

BACKGROUND OF THE INVENTION

Synchronous rectifiers increasingly are replacing freewheeling diodes on the secondary side of DC-DC buck converters in order to increase the power conversion efficiency of the converters. One characteristic of DC-DC converters with synchronous rectification is that it is possible for the current to flow not only to the output terminals of the converter through the synchronous rectifiers but also in a reverse direction from the output terminals back into the converter, i.e., a DC-DC converter with synchronous rectification can have both current-sourcing and current-sinking capability.

In most implementations of secondary side synchronous rectifiers, one problem that exists is that the gates of the synchronous rectifier FETs (field-effect transistors) are left saturated by the gate driver circuit for these rectifiers when the DC-DC converter is turned off. This produces a negative undershoot at the positive output terminal of the DC-DC converter during turn off. This negative undershoot can be harmful to a system that is being powered by the power converter if the output voltage of the converter goes lower than approximately −0.3 volt.

More specifically, a typical synchronous rectified DC-DC converter includes two MOSFETs (metal oxide semiconductor FETs) on the secondary side of the power transformer of the converter. A first synchronous rectifier MOSFET is connected between one end of the secondary winding of the power transformer and an output capacitor. The other end of the output capacitor is coupled to the other end of the secondary winding. The second synchronous rectifier MOSFET is coupled in parallel with the output capacitor. Typically, the node common to the two synchronous rectifiers is also coupled to the positive output terminal of the converter via a filter inductor. The undershoot that occurs when the DC-DC converter is turned off is caused by the fact that the secondary side auxiliary power source Vcc will typically continue to power the gate driver circuit for the synchronous rectifiers after the converter's output voltage falls off. This causes one or both of the gates of the synchronous rectifier MOSFETs to remain saturated at turn off. This creates a path for the output inductor of the converter to discharge into as follows. During shutdown of the converter, the output inductor first discharges into the load coupled across the output terminals of the power converter as the output voltage begins to fall. Then, the polarity of the inductor reverses (due to the energy stored in the transformer core) and current is driven from the positive output terminal of the converter to the negative output terminal. This causes the voltage on the positive output terminal to go negative. A voltage lower than −0.3 volts coupled to the input of integrated circuits (ICs) powered by the DC-DC converter could cause conduction which may damage the ICs if there is enough energy present. FIG. 4A illustrates a waveform 400 which is an exemplary output voltage generated by a synchronous rectified DC-DC converter during turn off, and shows the generation of negative undershoot. As can be seen in FIG. 4A, at some time after the converter has been turned off, the output voltage of the converter drops below a baseline voltage 402, e.g., 0 volts, thereby resulting in a temporary undershoot of, in this example, about −800 millivolts.

Accordingly, there is a need to design a synchronous rectified DC/DC power converter that eliminates the occurrence of a negative undershoot when the converter is turned off, and the consequences thereof.

SUMMARY OF THE INVENTION

The present invention comprises an undershoot eliminator circuit for avoiding the occurrence of a negative undershoot that typically happens when an isolated DC-DC converter with a secondary side synchronous drive is turned off. The undershoot eliminator circuit preferably employs a capacitor to maintain a charge on the gate of a clamp transistor coupled between the output of the secondary side's auxiliary power supply and the positive output terminal of the converter for a period of time after the DC-DC power converter is turned off. The clamp transistor is caused to turn on only when the output voltage of the converter begins to drop during shutdown. When the clamp transistor goes on, it causes the storage capacitor in the auxiliary power supply to be coupled to the positive output terminal of the connecter, so as to cause the storage capacitor to quickly discharge into the load. This prevents a negative undershoot from occurring because the synchronous rectifiers of the DC-DC power converter are thereby also quickly turned off.

The undershoot eliminator circuit operates independently of the input side of the DC-DC power converter, and is only triggered when the output of the DC-DC power converter drops off during shutdown.

Broadly stated, in a power converter for converting an input DC voltage into an output DC voltage at first and second output terminals and including synchronous recitification on the secondary side of said converter, an undershoot eliminator circuit according to the present invention for discharging an energy storage element in an auxiliary supply on said secondary side of said converter comprises a transistor having a gate terminal, a source terminal, and a drain terminal, the drain terminal of the transistor connected to said storage element, the source terminal of the transistor connecting to the said first output terminal, means for trapping charge on the gate terminal of said transistor while said converter is on, and means for coupling the voltage on said first output terminal to said gate terminal, such that, when said converter goes off and said output voltage begins to drop, the trapped charge causes the gate-to-source voltage of said transistor to increase until the gate of said transistor is sufficiently saturated to cause said transistor to turn on for a sufficient time to cause said storage element to discharge.

A method according to the present invention for preventing negative undershoot in the output voltage produced on an output terminal of a DC/DC power converter having secondary side synchronous rectification and a secondary side auxiliary power supply comprises when the converter is in an on state, trapping a charge on a gate terminal of a transistor coupled between said secondary side auxiliary power supply and said output terminal, and when the converter goes off, causing said transistor to turn on as the output voltage drops, thereby discharging the energy stored in said auxiliary power supply.

In a second embodiment of the present invention, in a power converter for converting an input DC voltage into an output DC voltage at first and second output terminals and including synchronous recitification on the secondary side of said converter, an undershoot eliminator circuit for discharging a storage capacitor in an auxiliary supply on said secondary side of said converter comprises a transistor having a gate terminal, a source terminal, and a drain terminal, the drain terminal of the transistor connected to said storage capacitor, the source terminal of the transistor connecting to the said first output terminal, a capacitor coupled between the gate of said transistor and the second output terminal, a resistor coupled between the source terminal and the gate terminal of said transistor, a second resistor coupled between the drain terminal and the gate terminal of said transistor, and a diode coupled between said storage capacitor and the drain terminal of said transistor.

Advantageously, the present invention discharges the secondary side Vcc storage capacitor quickly during shutdown in order to prevent undershoot (i.e., negative voltage on +Vout). Moreover, the present invention is not dependent on any signal generated from the primary side of the power supply. Furthermore, the present invention is simple to implement and requires a minimal number of components.

Other structures and methods are disclosed in the detailed description below. This summary does not purport to define the invention. The invention is defined by the claims. These and other embodiments, features, aspects, and advantages of the invention will become better understood with regard to the following description, appended claims and accompanying drawings.

Reference symbols or names are used in the figures to indicate certain components, aspects or features therein. Reference symbols common to more than one figure indicate like components, aspects or features shown therein.

DETAILED DESCRIPTION OF PREFERRED EMBODIMENTS

Figure 1:
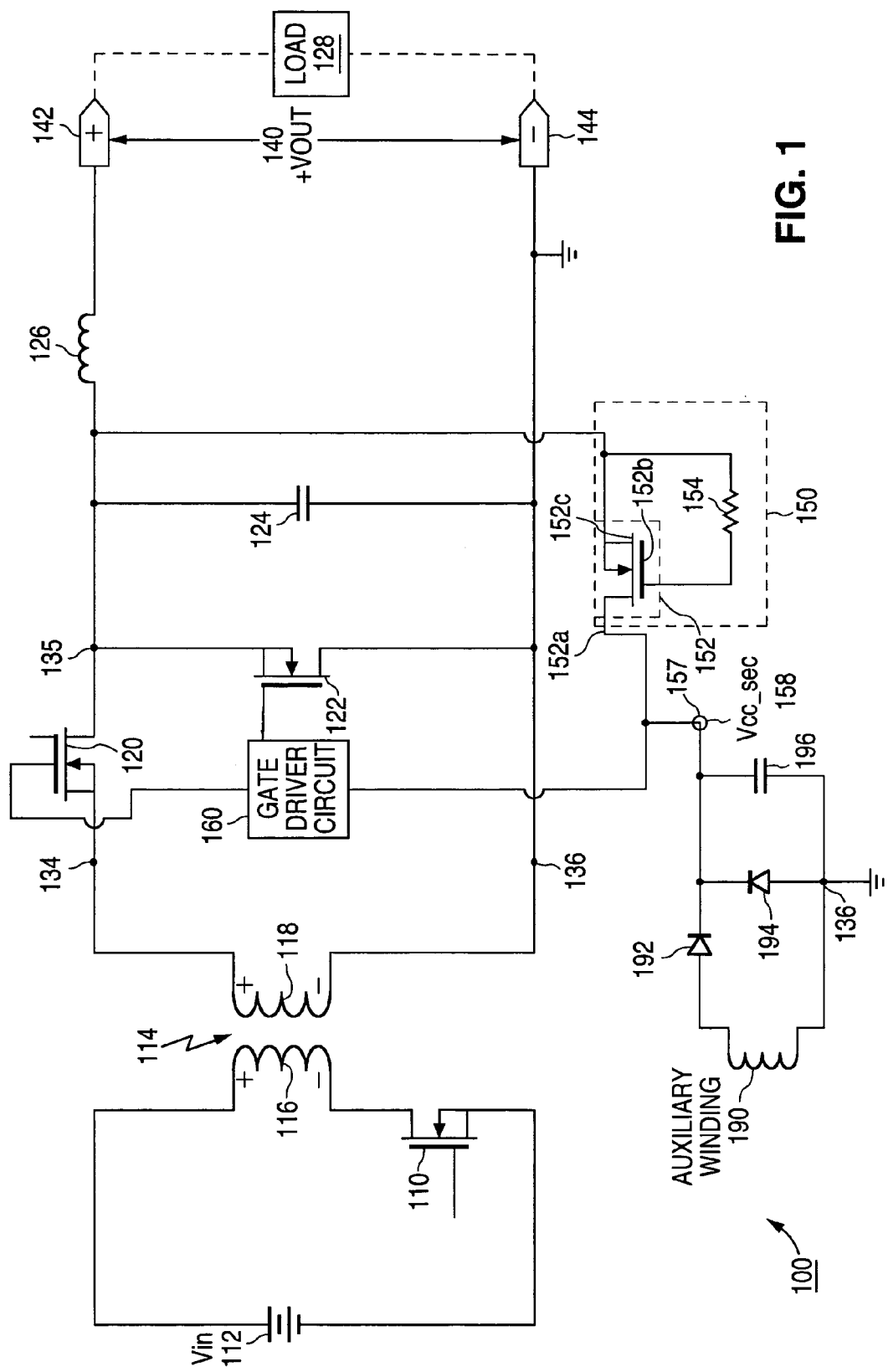
FIG. 1 is a schematic diagram illustrating a first embodiment of an isolated DC-DC power converter with secondary side synchronous rectification that includes an undershoot eliminator circuit in accordance with the present invention.

Referring now to FIG. 1, there is shown a schematic diagram illustrating an isolated DC-DC power converter 100 with secondary side synchronous rectification that includes a first embodiment of an undershoot eliminator circuit 150 according to the present invention. In the exemplary power converter 100 shown in FIG. 1, a power switch 110 is connected in series with a primary winding 116 of a transformer 114 across an input DC voltage source Vin 112. The power switch 110 is alternately switched between an on period and an off period in response to a signal applied to a control gate of the power switch 110 by a conventional pulse width modulator (PWM, not shown). The signal provided by the PWM is generated in response to a feedback signal from a feedback loop (not shown) which is responsive to an output voltage, Vout 140, of power converter 100.

On the secondary side of power converter 100, a secondary winding 118 of the transformer 114 is coupled to a positive voltage rail at node 134 and a negative voltage rail at node 136. A first synchronous rectifier 120 is connected between the secondary winding 118 at node 134 and a node 135. A second synchronous rectifier 122 is connected between node 135 and the negative side of the secondary winding 118 at node 136, which corresponds to the secondary side's ground. The second synchronous rectifier 122 is connected in parallel to an output capacitor 124. An inductor 126 is connected between node 135 and a positive output terminal 142 (+Vout) of converter 100. Node 136 is connected to a negative output terminal 144 (−Vout) of connector 100. The output voltage Vout is generated across output terminals 142, 144. Converter 100 provides power to a load 128 connected between the positive and negative output terminals 142 and 144.

The gates of synchronous rectifiers 120 and 122 are driven by a gate driver circuit 160 in a conventional fashion in order to provide the on and off times for these synchronous rectifiers 120, 122 to thereby provide the desired operation of the power converter 100 to generate Vout across output terminals 142 and 144. Typically, gate driver circuit 160 (as well as any other secondary side circuits) is powered by a voltage Vcc generated on the secondary side of the power transformer 114. As seen in FIG. 1, this secondary side voltage is indicated as Vcc_sec 158. This Vcc voltage is typically set at 5 volts. As also seen in FIG. 1, auxiliary voltage Vcc_sec 158 is generated in a conventional fashion using an auxiliary secondary winding 190 of transformer 114. Winding 190 is connected to two rectifier diodes, 192 and 194, that feed a Vcc storage capacitor 196 connected between an output terminal 157 of the auxiliary supply and node 136. The auxiliary output voltage Vcc_sec is generated across and maintained by storage capacitor 196 during the normal operation of power converter 100.

The undershoot eliminator circuit according to the present invention is shown at 150 in FIG. 1 and functions to discharge storage capacitor 196 in the auxiliary voltage supply at shutdown of the power converter 100. The undershoot eliminator circuit 150 operates independently of the input side of the power converter 100. Undershoot eliminator circuit 150 is triggered when the output voltage Vout generated by the power converter 100 drops off during shutdown. Circuit 150 includes a MOSFET clamp transistor 152 having three terminals, a drain terminal 152a, a gate terminal 152b, and a source terminal 152c. The drain terminal 152a of clamp transistor 152 is connected to the output terminal 157 of the auxiliary voltage supply, where the Vcc_sec voltage is output, while the source terminal 152c is connected to node 135. Coupled between the source 152c and the gate 152b is a resistor 154. Resistor 154 is preferably a large resistance in the range of 1–10 meg-Ω. The function of resistor 154 in the undershoot eliminator circuit 150 is to ensure that the gate terminal 152b of transistor 152 is charged to a level that is at or above the power converter 100 output voltage, Vout 140.

The undershoot eliminator circuit 150 shown in FIG. 1 operates as follows. When the DC-DC power converter 100 is on, resistor 154 couples the output voltage +Vout to the gate of transistor 152. The inherent gate to source capacitance Cg_s of transistor 152 is therefore charged to this voltage. According to the present invention, sufficient charge is retained on the transistor 152 gate to source capacitance Cg_s to cause transistor 152 to go on as the output voltage Vout drops when the converter 100 is turned off, and to stay on for a sufficient time to substantially discharge storage capacitor 196. That is, when the voltage on the source terminal 152c drops due to the dropping of output voltage +Vout, the gate to source voltage of transistor 152 increases until the gate of transistor 152 us sufficiently saturated to cause transistor 152 to turn on and become conductive between its drain and source terminals 152a and 152c. Once transistor 152 is turned on, it couples the output terminal 157 of the auxiliary voltage source to output terminal 142 via inductor 126, thereby causing storage capacitor 196 to discharge while output voltage +Vout continues to drop towards zero volts. This discharging of storage capacitor 196 prevents the gates of synchronous rectifiers 120 and 122 from remaining saturated, thereby causing them to also turn off as a function of the drop in +Vout. As a result, no negative undershoot is generated on +Vout, since neither of the synchronous rectifiers 120, 122 is able to provide a current path, as described above, that would otherwise allow current to be coupled back across inductor 126 from output terminal 142.

Note that a separate resistor 154 may not be necessary in order to provide the above described functionality of the undershoot eliminator circuit 150 according to the present invention. Specifically, there may be sufficient intrinsic resistance in transistor 152 between its source terminal 152c and its gate terminal 152b to provide sufficient coupling to cause the gate terminal 152b of transistor 152 to rise to the voltage Vout. If such a circuit topology is used, care must be taken, however, that the charge on the gate terminal 152b of transistor 152 is discharged quickly through the same path when the power converter 100 is turned off. Otherwise, the auxiliary voltage Vcc_sec could be pulled down during the next power on sequence of converter 100.

Figure 2:
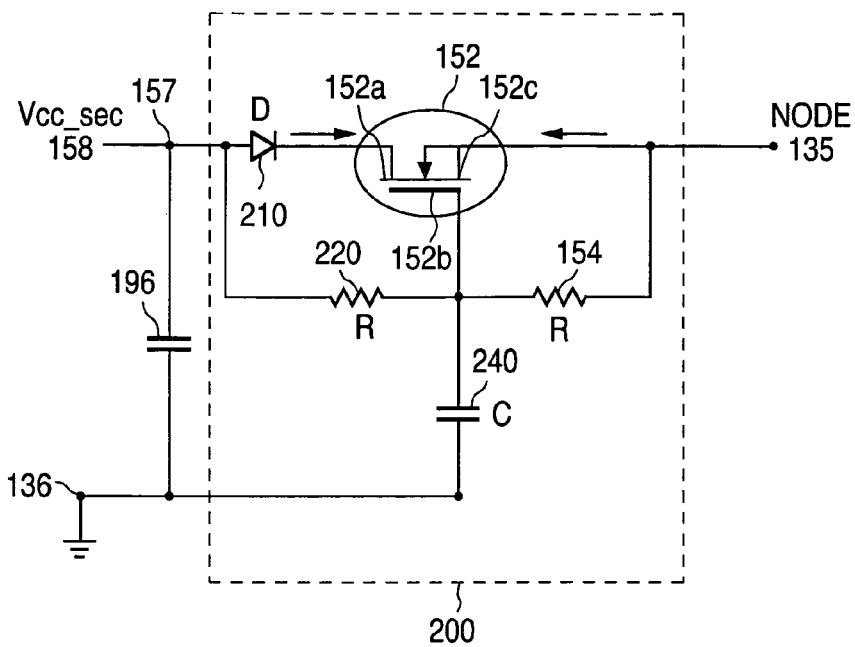
FIG. 2 is a schematic diagram illustrating an isolated DC-DC power converter with secondary side synchronous rectification that includes a second embodiment of an undershoot eliminator circuit in accordance with the present invention.

FIG. 2 is a schematic diagram illustrating a second embodiment of an undershoot eliminator circuit 200 according to the present invention. The undershoot eliminator circuit 200 comprises, in addition to transistor 152 and resistor 154, one or more other components. A second resistor 220 may be connected between the gate terminal 152b of transistor 152 and the output terminal 157 of the auxiliary power supply. Resistor 220 is typically a large resistor in the range of 1 to 10 meg-Ω. Resistor 220 is an optional component that creates a voltage divider circuit between the auxiliary power supply output terminal 157 and node 135 to positively offset the gate terminal 152b of transistor 152, thereby causing the gate to saturate harder. In other words, resistor 220 is used to shift the Vg_s voltage up slightly so that a smaller +Vout 142 drop is sufficient to turn on transistor 152, resulting in the undershoot eliminator circuit 100 activating sooner and sinking more charge from the storage capacitor 196 to output terminal 142.

Another component that can be included in undershoot eliminator circuit 200 is a capacitor 240 connected between the gate terminal 152b of transistor 152 and node 136. Capacitor 240 is an optional component that enhances the holding of charge on the gate terminal 152b of transistor 152 during the time when the voltage +Vout at terminal 142 is dropping out. Capacitor 240 is not needed if the capacitance Cg_s of transistor 152 is able to retain sufficient charge to hold transistor 152 on, as +Vout 140 drops, long enough to enable storage capacitor 196 to discharge to a level that prevents synchronous rectifiers 120 and 122 from remaining on.

An optional diode 210 is connected between terminal 157 and the drain terminal 152a of transistor 152. Diode 210 prevents reverse current being coupled from Vout to node 157 to thereby saturate one or both gates of synchronous rectifiers 120 and 122. This possible reverse current is caused by the intrinsic diode in transistor 152. In other words, diode 210 keeps a back-drive voltage on the +Vout terminal 142 from being coupled to terminal 157 and thereby provide sufficient voltage to saturate the gates of one or both the synchronous rectifiers 120, 122 in the power converter 10. In such a scenario, the absence of diode 210 would cause the output of the converter 100 to look like a short circuit and create a current sink.

One of ordinary skill in the art should recognize that other variations and modifications can be practiced without departing from the spirit of the present invention.

Figure 3:
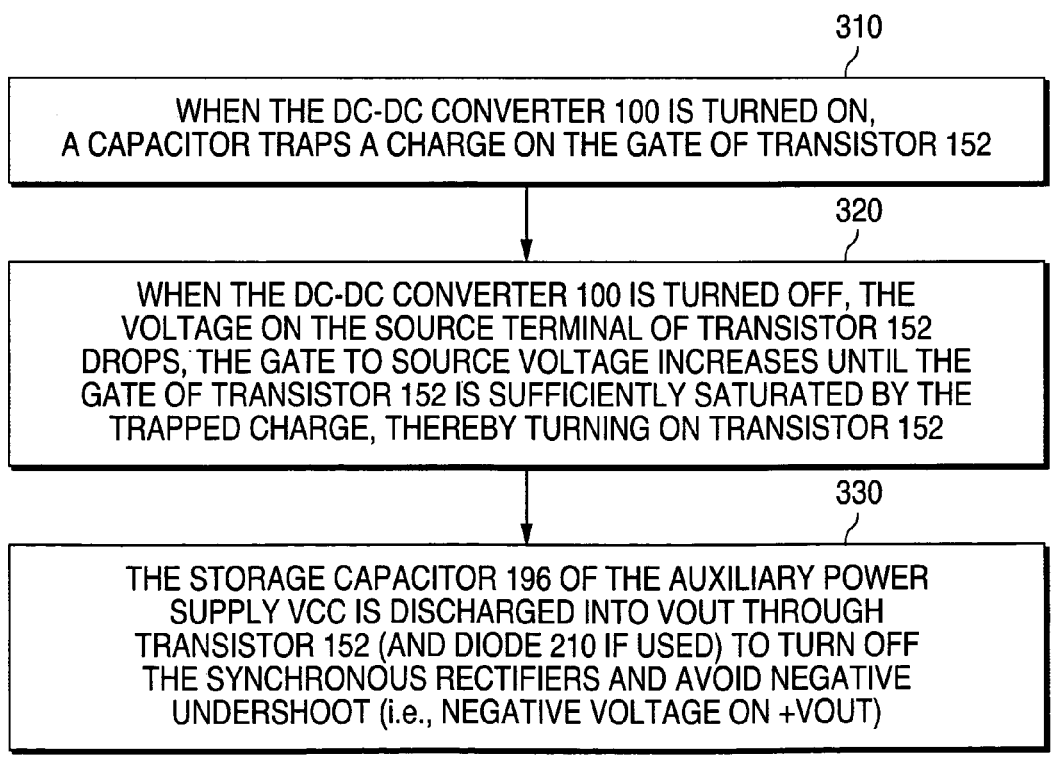
FIG. 3 is a flow chart illustrating the process for eliminating negative undershoot in a synchronous rectified DC-DC power converter in accordance with the present invention.

FIG. 3 is a flow chart that illustrates the process 300 according to the present invention for eliminating negative undershoot in the output voltage of a synchronous rectified DC-DC converter 100. At step 310, when the DC-DC power converter 100 is on, a capacitor traps a charge on the gate of transistor 152. At step 320, when the DC-DC power converter 100 is turned off, or otherwise goes off, the voltage on the source terminal of transistor 152 drops. As a result, the gate to source voltage of transistor 152 increases until the gate of the transistor is sufficiently saturated by the trapped charge, thereby causing transistor 152 to turn on. At step 330, storage capacitor 196 of the auxiliary power supply Vcc is discharged into Vout through transistor 152 (and diode 210 if used) to turn off the synchronous rectifiers and avoid negative undershoot (i.e., negative voltage on +Vout).

Figure 4A:
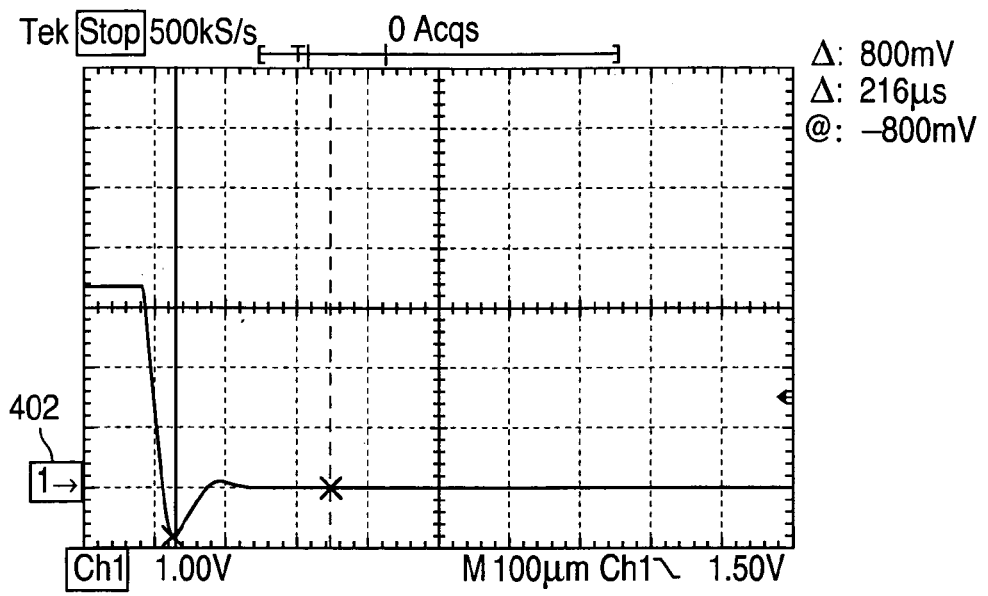
FIG. 4A is a graphical diagram of the output voltage of a synchronous rectified DC-DC converter experiencing negative undershoot when the converter is turned off.
Figure 4B:
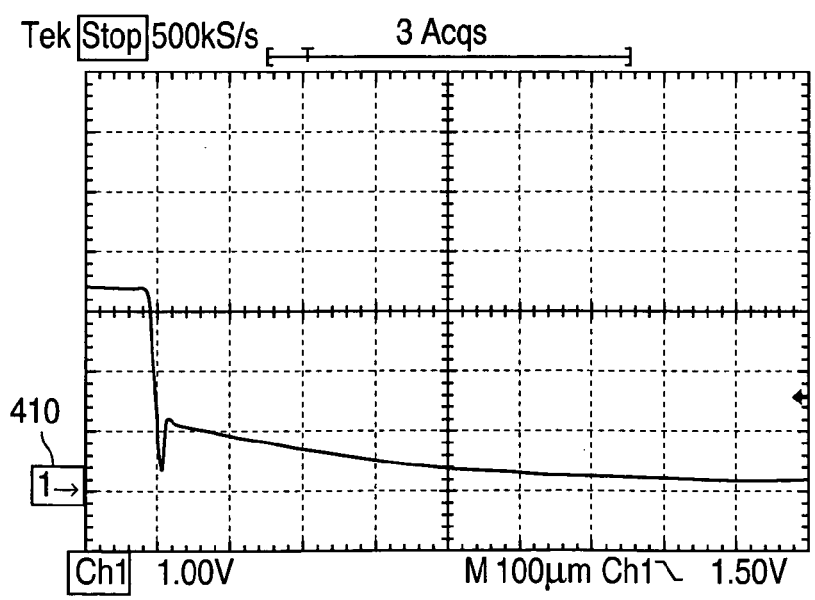
FIG. 4B is a graphical diagram of the converter's output voltage during turn off with the addition of an undershoot eliminator circuit in accordance with the present invention.

FIG. 4B, is a graphical diagram illustrating a waveform 408 generated as a function of the operation of an undershoot eliminator circuit 150 or 200 according to the present invention in a synchronous rectified DC-DC converter. With the undershoot eliminator circuit 150 or 200, the resulting waveform 408 shows a signal voltage that remains above a baseline voltage 410 for a significant period of time. In a preferred embodiment, baseline voltage 410 is zero volts. Although the output voltage drops when the DC-DC power converter 100 goes off, the output voltage remains above the baseline voltage 410, and only slowly approaches zero volts over time, thereby avoiding any negative undershoot from occurring.

Those skilled in the art can now appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications, whether explicitly provided for by the specification or implied by the specification, will become apparent to the skilled practitioner upon a study of the drawings, specification, and following claims.

What is claimed is:

1. In a power converter for converting an input DC voltage into an output DC voltage at first and second output terminals and including synchronous rectification on a secondary side of said converter, an undershoot eliminator circuit for discharging an energy storage element in an auxiliary supply on said secondary side of said converter, comprising:

a transistor having a gate terminal, a source terminal, and a drain terminal, the drain terminal of the transistor connected to said storage element, the source terminal of the transistor connecting to the said first output terminal;

means for trapping charge on the gate terminal of said transistor while said converter is on; and means for coupling the voltage on said first output terminal to said gate terminal, such that, when said converter goes off and said output voltage begins to drop, the trapped charge causes the gate-to-source voltage of said transistor to increase until the gate of said transistor is sufficiently saturated to cause said transistor to turn on for a sufficient time to cause said storage element to discharge.

2. The power converter circuit of claim 1, wherein said transistor is a MOSFET and wherein the means for trapping charge on the gate terminal of said transistor comprises the inherent gate to source capacitance of said MOSFET.

3. The power converter circuit of claim 1, wherein said means for trapping charge on the gate terminal of said transistor comprises a capacitor coupled between the gate of said transistor and the second output terminal.

4. The power converter circuit of claim 1, wherein said transistor is a MOSFET and wherein said means for coupling the voltage on said first output terminal to said gate terminal comprises the intrinsic resistance between the source terminal and the gate terminal of said MOSFET.

5. The power converter circuit of claim 1, wherein said means for coupling the voltage on said first output terminal to said gate terminal comprises a resistor coupled between the source terminal and the gate terminal of said transistor.

6. The power converter circuit of claim 1, further comprising a resistor coupled between the drain terminal and the gate terminal of said transistor.

7. The power converter circuit of claim 1, further comprising a diode coupled between said storage element and the drain terminal of said transistor.

8. A method for preventing negative undershoot in the output voltage produced on an output terminal of a DC/DC power converter having secondary side synchronous rectification and a secondary side auxiliary power supply, comprising:

when said converter is in an on state, trapping a charge on a gate terminal of a transistor coupled between said secondary side auxiliary power supply and said output terminal; and when said converter goes off, causing said transistor to turn on as the output voltage drops, thereby discharging the energy stored in said auxiliary power supply.

9. The method of claim 8, wherein the energy stored in said auxiliary power supply comprises the charge on a storage capacitor in said supply.

10. In a power converter for converting an input DC voltage into an output DC voltage at first and second output terminals and including synchronous recitification on the secondary side of said converter, an undershoot eliminator circuit for discharging a storage capacitor in an auxiliary supply on said secondary side of said converter, comprising:

a transistor having a gate terminal, a source terminal, and a drain terminal, the drain terminal of the transistor connected to said storage capacitor, the source terminal of the transistor connecting to the said first output terminal;

a capacitor coupled between the gate of said transistor and the second output terminal; and a resistor coupled between the source terminal and the gate terminal of said transistor.

11. The power converter of claim 10, further comprising:

a second resistor coupled between the drain terminal and the gate terminal of said transistor; and a diode coupled between said storage capacitor and the drain terminal of said transistor.

* * * * *